United States Patent [19]

Roden

[11] Patent Number: 4,747,255
[45] Date of Patent: May 31, 1988

[54] CUTTER-BAR SUPPORT

[76] Inventor: Thomas V. Roden, 3775 Co. Hwy. I, Saukville, Wis. 53080

[21] Appl. No.: 844,457

[22] Filed: Mar. 26, 1986

Related U.S. Application Data

[63] Continuation-in-part of Ser. No. 796,516, Nov. 8, 1985, abandoned, which is a continuation of Ser. No. 113,053, Jan. 17, 1980, abandoned.

[51] Int. Cl.$^4$ .................. A01D 75/18; A01D 34/04; A01D 67/00
[52] U.S. Cl. .................................. 56/10.4; 56/15.8; 56/DIG. 10; 56/DIG.22
[58] Field of Search ............... 56/238, 10.4, 15.3, 56/15.7, 15.8, 17.1, 17.2, DIG. 10, DIG.22

[56] References Cited

U.S. PATENT DOCUMENTS

| | | | |
|---|---|---|---|
| 2,138,305 | 11/1938 | Null | 56/298 |
| 2,281,639 | 5/1942 | Swan | 56/17.2 |
| 2,385,568 | 9/1945 | Draim | 56/17.2 |
| 2,401,513 | 6/1946 | Schmidt | 56/238 |
| 2,431,663 | 1/1947 | Scranton | 56/307 |
| 2,509,993 | 5/1950 | Soss | 56/121 |
| 2,575,120 | 11/1951 | Peel | 56/126 |
| 2,590,788 | 3/1952 | Novak | 56/307 |
| 2,696,704 | 12/1954 | Bjork | 56/15.7 |
| 2,710,517 | 6/1955 | Huddon | 56/238 |
| 2,732,675 | 1/1956 | Smith et al. | 56/10.4 |
| 3,063,226 | 11/1962 | Pfauser | 56/DIG. 22 |
| 3,064,412 | 11/1962 | Schaeffer | 56/298 |
| 3,267,654 | 8/1966 | Hanson et al. | 56/17.1 |
| 3,408,798 | 11/1968 | Hale et al. | 56/15.3 |
| 3,483,684 | 12/1969 | Price | 56/13.6 |
| 3,654,749 | 4/1972 | Ostergrien et al. | 56/DIG. 22 |
| 3,743,028 | 7/1973 | McCloud | 56/17.2 |
| 4,120,136 | 10/1978 | Rosie | 56/17.1 |
| 4,253,296 | 3/1981 | Boydston | 56/238 |

Primary Examiner—Paul J. Hirsch
Attorney, Agent, or Firm—Emrich & Dithmar

[57] ABSTRACT

An agricultural mower including a parallel linkage suspension mechanism for the cutter assembly, the suspension mechanism including swing arms which in the use position are substantially vertically oriented, enabling the cutter assembly, upon striking an object, to respond by moving quickly rearwardly relative to the forwardly traveling main frame, and then, as the pendulum action continues, to elevate the cutter assembly above the obstruction to a clearing height. In the use position, the cutter bar and guards are directed down and forward defining the lowest and leading part of the cutter assembly.

7 Claims, 3 Drawing Sheets

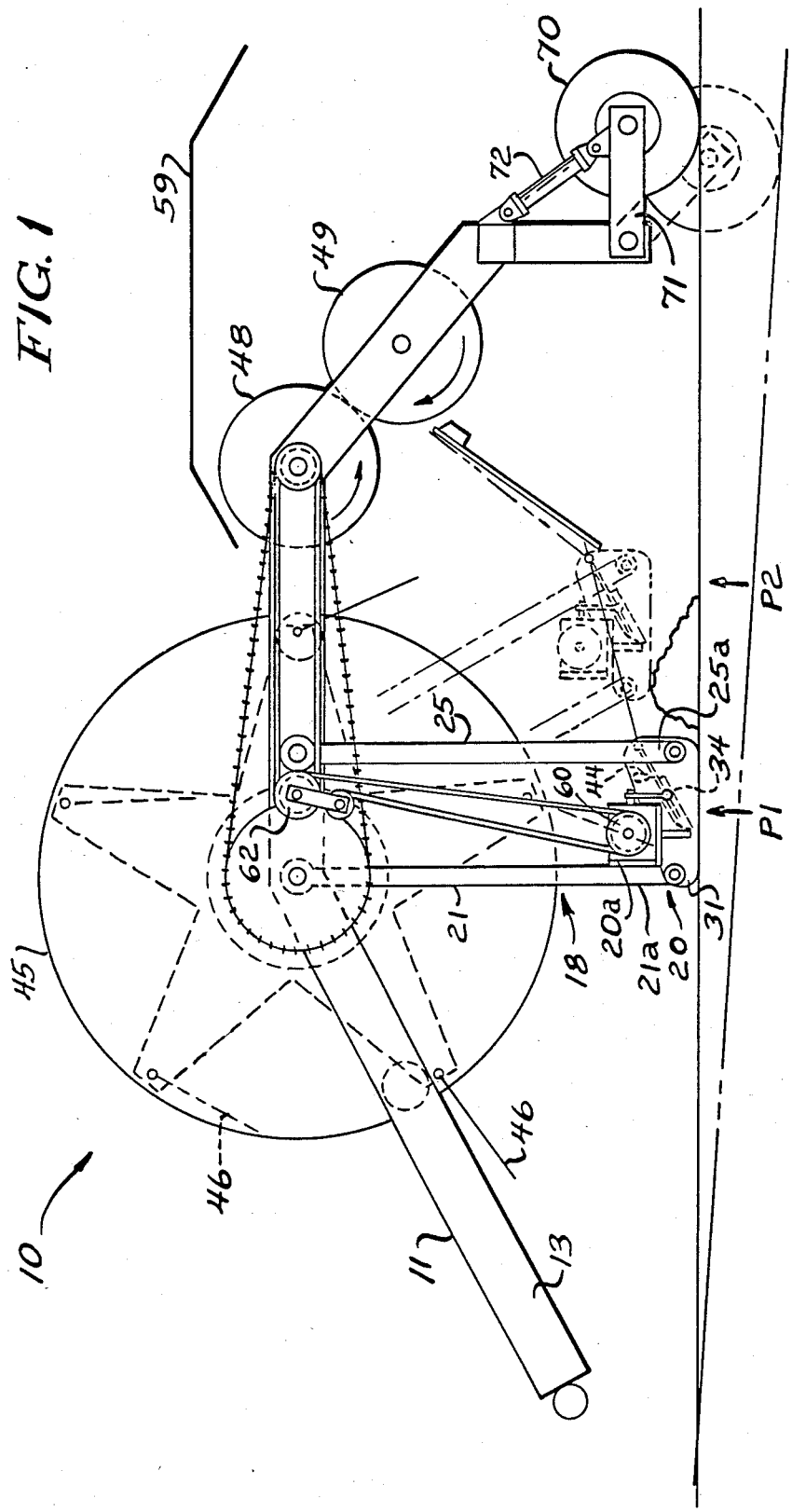

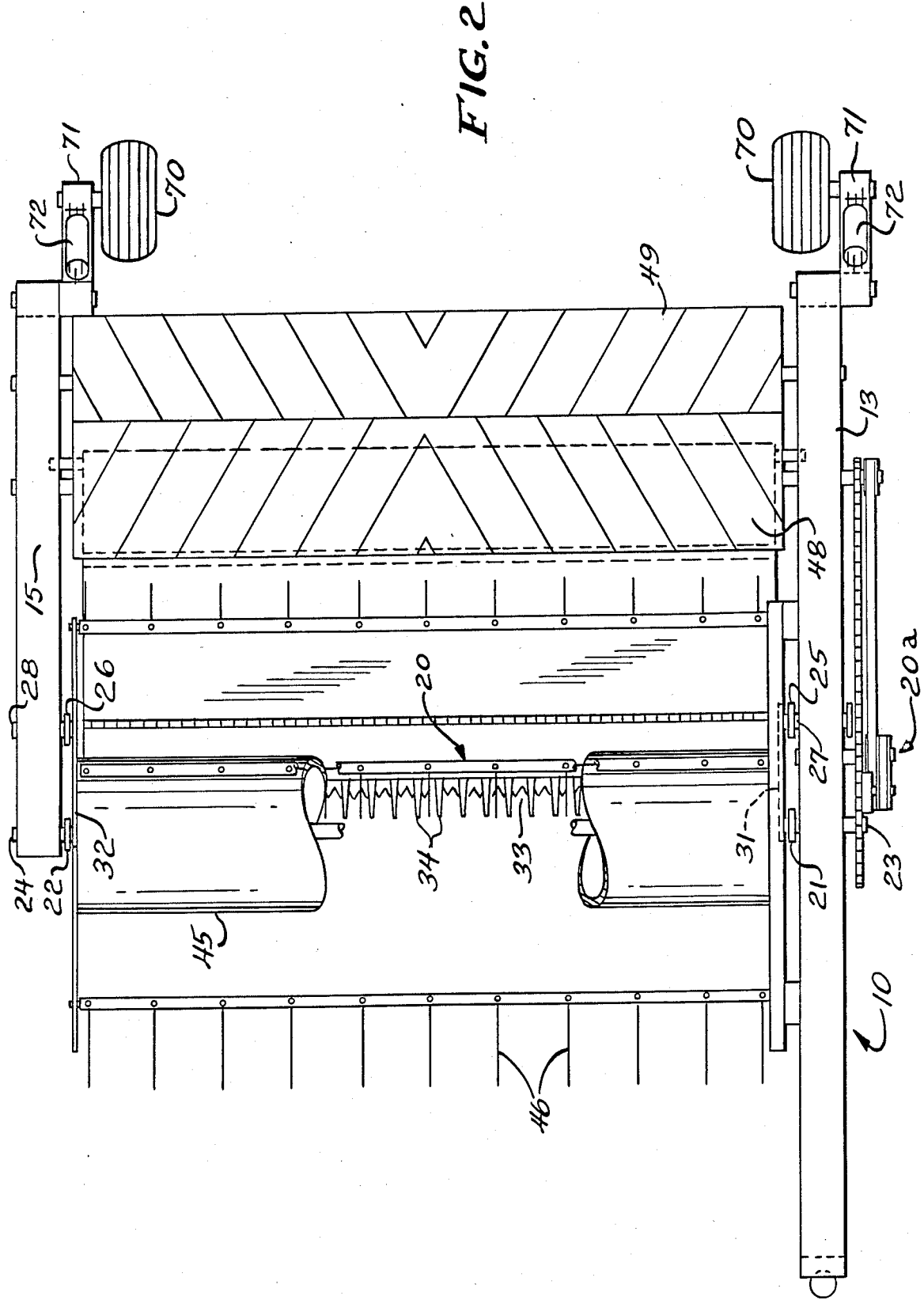

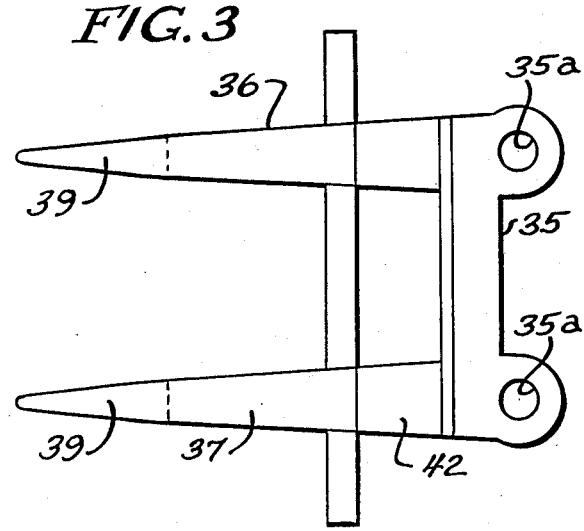
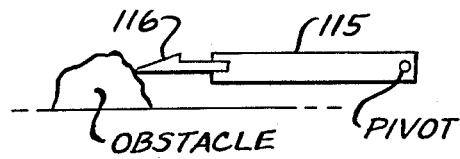
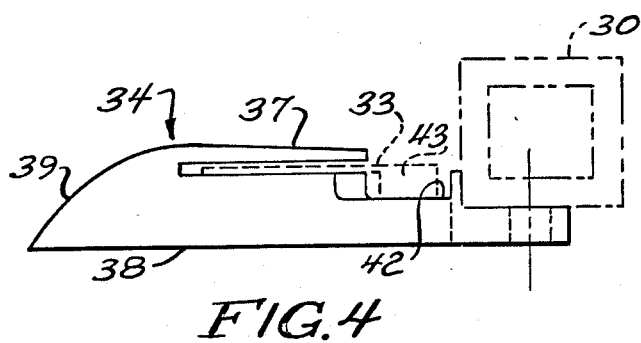
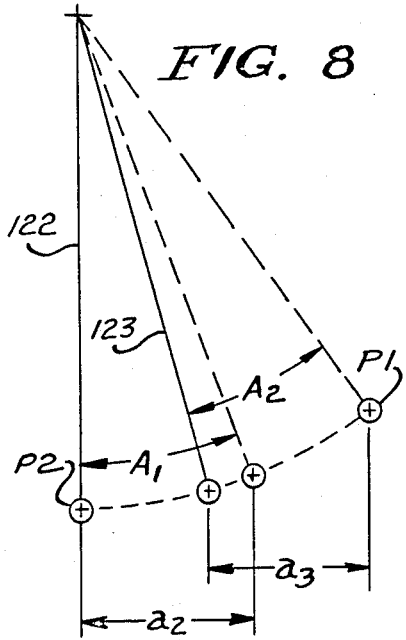
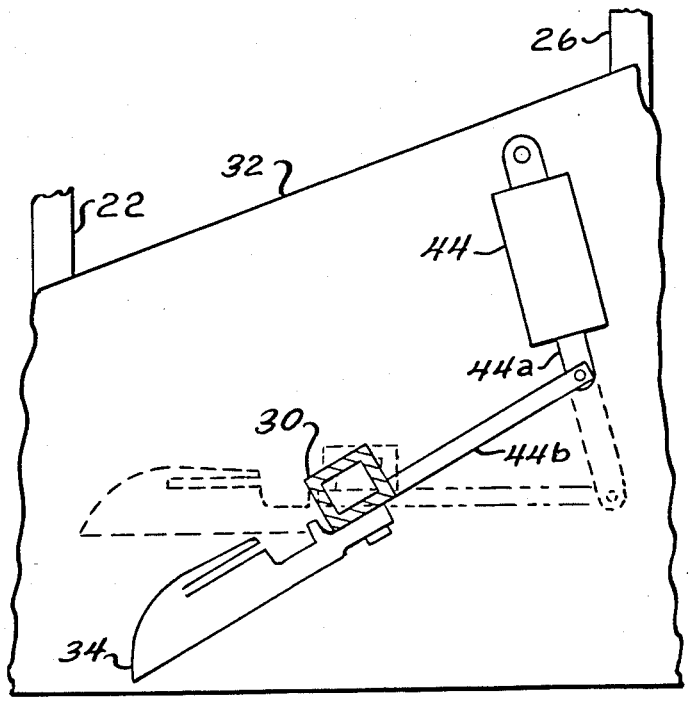

CUTTER-BAR SUPPORT

RELATED APPLICATION

This is a continuation-in-part of my application Ser. No. 796,516, filed Nov. 8, 1985, now abandoned which is a continuation of my application Ser. No. 113,053, filed Jan. 17, 1980, now abandoned.

BACKGROUND OF THE INVENTION

The present invention relates to an agricultural mower having a cutter bar of the type used in mowing hay or other forage crops. More specifically, it relates to an arrangement of the cutter assembly and its suspension.

Hay mowers are large machines which in use travel at fairly high ground speeds. As used herein, the term "hay mowers" is intended to be broad enough to include a large range of agricultural mowing equipment. For example, some manufacturers call them mower/conditioners, or "haybiners". Mowers are generally pulled by a tractor. The mower is located to the side so that the tractor operates in a swath already cut and does not mat the hay into the ground. Whether the crop is standing upright or fallen over and matted by the weather, it hides most obstacles from sight. Thus, the size and speed of operation, the remoteness of the cutter from the operator and the tendency of the crop to hide obstacles, all make it difficult for the operator to see potential obstacles or immediately to notice any damage which may occur.

Although some agricultural mowers use rotary cutting blades, the present invention uses a sickle bar cutter because I find it more desirable in recovering more of the nutritious elements of the crop, particularly when the crop is matted or "lodged" as it is sometimes called. The cutter blades of a sickle bar act like scissors in that a horizontally extending blade forms a "V" with a guard member so that when the blade is reciprocated it cuts the hay at its base in a scissors-like action. To reduce the possibility of damage to the blade, an elongated point or "guard" is mounted adjacent each section or cutting edge of the blade and projects in front of the horizontal cutter blade. The guards are normally more sturdy and serve to separate the stems of the plants while guiding the separated stems into the cutters, and to protect the cutter mechanisms themselves by engaging obstructions before the cutting edges encounter them. A number of such guards are mounted side-by-side and, together with the blades are collectively referred to as a "cutter bar".

As the apparatus traverses a field, the cutter blade is continuously reciprocated within the guard by a common power drive mechanism. If the cutter blade were to strike an obstacle, such as a rock, not only would it damage that particular cutting mechanism, but if the damage were such as to bend the cutter blade, it could prevent proper operation of the entire cutter bar. Because the cutter bar is located remotely from the operator, the damage may go unnoticed for some time. It is, therefore, very important to prevent damage to the cutter bar assembly.

Hay crop, after it has matured, tends to become matted under its own weight against the ground. One reason for desiring to cut hay as close as possible to the ground is that valuable elements of nutrition are believed to be present in the base of the stem of the plant. It is difficult to harvest all of the crop that is desired when hay is lodged because conventional cutter bars have the blade and guards horizontal. Thus, the cutter engages the base of the plant at an acute angle rather than perpendicular. The reason cutter bars are horizontal is that they are suspended by a mechanism which includes a pivot which is located almost directly behind the guard. Thus, when the point strikes an object, it rotates (when viewed from the right) like the hand of a clock going from the six o'clock to the five or four o'clock positions. If the hay mower is operated with its cutter blades located very close to the ground another problem arises. The lower the cutter bar is located, the greater the possibility that the cutter will engage rocks or other obstacles.

To reduce damage to the cutter bar in the above-mentioned prior commercial hay mowers, the cutter bar was permitted to rotate upwardly and then rearwardly out of the normal use position when the guards engaged an obstruction. However, such conventional designs mounted the entire header assembly (which includes the cutter bar, drive shaft and frame) between side plates which define a rigid structure typically seven to twelve feet long and of considerable weight. As mentioned, the header assembly was mounted so that it pivoted about a transverse axis located at appoximately the same height as the guards, but behind them, so that when the guards strike an obstruction, the header assembly rotates clockwise upwardly and away from the obstruction, as represented schematically in FIG. 5.

Because the pivot axis for the cutter bar is behind the bar itself, a substantial impact force is normally encountered before the header assembly will respond. At normal operating speeds, this has the tendency to damage the header even if it is spring-biased, particularly if the obstacle struck has an upright surface. It will be observed that the initial movement of the prior art cutter when it hits an object is upward. Any rearward movement is slight at first because of the location of the pivot. Due to the size and weight of the header and the high ground speeds, damage can and does occur.

In U.S. Pat. No. 3,063,226 issued to E. M. Pfauser, there is disclosed a riding type rotary mower having the housing of a rotary cutting unit suspended beneath the mower by means including a parallel linkage arrangement. The mower is capable of traversing uneven terrain, and for this purpose, runners are provided at the edges of the housing to lift the cutter housing when a runner rides over a mound. The drive shafts to the rotary mower blades are provided with splines so that as the housing raises, the drive shafts telescope. Also, the axes of the links of the parallel suspension linkage are set at an angle with the vertical of approximately 70° which permit slight rearward movement of the cutter housing as the housing raises.

The runners at the sides of the cutter housing do not ordinarily touch the ground but in normal operation are held at a predetermined height from the ground. Damage to the cutting unit is avoided if an obstacle in the path of the mower is engaged by the runner allowing it to lift the cutting unit over the obstacle. However, the runners would be ineffective to lift the cutting unit if the forward vertical wall of cutter housing were to strike an object, such as a rock, having a substantially vertical wall itself and having a height extending, for example, to the mid-point of the cutter housing.

The suspension mechanism of the rotary mower structure disclosed in the referenced patent is designed to elevate the cutter unit rather to displace it rearwardly because the couplings and the linkage accommodate only slight rearward movement. Thus, upon striking an obstacle, such as a rock, with a part of the cutter housing other than the runners, the cutter housing would respond substantially in the manner of the conventional rear-pivotted cutter bar assemblies.

SUMMARY OF THE INVENTION

It is a primary object of the present invention to provide an agricultural mower apparatus having a cutter bar mounting arrangement which allows a greater recovery of a forage crop and is capable of cutting the crop close to the ground while supporting the cutter bar assembly with a suspension system which reduces the mass of the moveable part of the cutter bar when an obstacle is encountered, and which moves the cutter bar first rearwardly thence upwardly in clearing the object.

In order to accomplish this, the present invention provides an agricultural mower apparatus including a main frame and a cutter assembly having a cutter bar with a plurality of cutter guards mounted thereon and suspension means mounting said cutter assembly on the frame. The cutter blade and cutter guards extend preferrably downwardly and forwardly of the bar with nose portions of the cutter guards defining the lowest and leading part of the cutter assembly. Further, the guards are shaped to extend upwardly and rearwardly in a smooth conformation to assist in lifting the lodged hay as the downwardly inclined blade engages the stems closest to the ground than formerly and at an angle which improve recovery of lodged hay by directing the blades at a more perpendicular angle relative to the stem than when the hay lies flat and the blade is horizontal. Further, the guards become wider toward the rear to facilitate guiding the hay into the cutter blades to achieve a scissors-like shearing action.

In one embodiment, the suspension means comprises a pair of front swing arms with upper ends pivotally attached to the forward end of the frame and a pair of rear swing arms with upper ends pivotally attached to the rearward end of the frame, the cutter assembly alone (i.e. without the side plates etc. normally seen on complete cutter head assemblies) being pivotally attached to lower ends of the swing arms. This reduces the mass of the assembly that must move when an obstacle is struck, and thereby increases response time and reduces damage.

When the cutter assembly is in the operating or use position, the forward swing arms and the rear swing arms are substantially vertically oriented. When the guards strike an obstruction, the swing arms pivot pendulum-like so that the cutter assembly moves both rearwardly and thence upwardly —like the hands of a clock moving from the six o'clock position to the five and then the four o'clock positions—to a clearance position above the obstacle. Further, because the preferred suspension system includes swing arms only at the sides of the cutter assembly and the cutter assembly is quite long (for example, seven to twelve feet in cutting swath), if the obstruction is located toward one side of the assembly, only that side will swing out of the way, not the entire cutter assembly. This further reduces the mass of the portion of the assembly that must be moved to clear an obstacle and thereby improves the response time and enhances the ability of the system to respond quickly at higher ground speeds, and leaves the other end of the bar in a cutting position so that an entire transverse swath of crop is not left every time the cutter bar must clear an obstacle.

Other features and advantages of the present invention will be apparent to persons skilled in the art from the following detailed descriptions of a preferred embodiment where identical reference numerals refer to like parts in the various views.

DESCRIPTION OF THE DRAWINGS

FIG. 1 is a side elevational view of a hay mower with the clearance position of the cutter assembly shown in phantom;

FIG. 2 is a top plan view of a hay mower of the present invention;

FIG. 3 is a plan view of a cutter guard provided by the present invention;

FIG. 4 is a side elevational view of the cutter guard shown in FIG. 3;

FIG. 5 is a fragmentary side elevational view of the cutter assembly and suspension system, illustrating the cutter bar in different use positions;

FIG. 6 is a schematic representation of the conventional manner of mounting cutting bars;

FIG. 7 is a schematic representation of the manner in which the cutting bar is mounted in the hay mower of the present invention; and FIG. 8 illustrates rearward displacement of the lower hinge portion of a freely pivoting links as a function of their angular orientation relative to the vertical.

DESCRIPTION OF THE PREFERRED EMBODIMENT

Referring to FIGS. 1 and 2, there is shown a hay mower generally designated 10 having a frame 11 with a left side section 13 and a right side section 15. As used herein, the terms left and right refer to the left and the right sides respectively looking in the direction of travel of the tractor. Stringers (not shown) are mounted between the left side section 13 and the right side section of the frame 11.

A parallel linkage suspension mechanism 18 supports the cutter assembly 20 (FIG. 2), which includes a reciprocating cutter blade 33 and its associated drive mechanism 20a, on the frame 11. The suspension mechanism 18 includes a pair of front swing arms 21 and 22 with associated front swing arm mounting shafts 23 and 24, and a pair of rear swing arms 25 and 26 with associated rear swing arm mounting shafts 27 and 28. The front swing arms 21 and 22 are pivotally mounted on respective shafts 23 and 24 which are mounted to the left side section 13 and the right side section 14, respectively of the frame 11. The rear swing arms 25 and 26 are pivotally mounted on respective shafts 27 and 28 which are mounted to the left side section 13 and right side section 15 of the frame 11 rearwardly of the front swing arm mounting shafts 23 and 24.

Referring to FIGS. 1, 2 and 5, the cutter assembly 20 comprises stringer or frame 30, a left side panel 31 and a right side panel 32. A plurality of cutter guards 34 are mounted side-by-side on frame 30. The guards 34 each have a horizontal slot 41 extending out the back. When the guards 34 are mounted to the stringer or frame 30, the slots 41 align laterally to define a continuous slot for receiving the cutter blade 33 while permitting it to reciprocate. Front swing arm 21 and rear swing arm 25 have respective lower ends 21a and 25a pivotally attached to the left side panel 31 at opposite edges thereof. Similarly, front swing arm 22 and rear swing arm 26 have respective lower ends (FIG. 5) pivotally attached to the right side panel 32 of the cutter assembly 20.

As will be shown, when the cutter assembly 20 is in the operating or use position, the cutter blade 33 is adjacent to the ground and the four swing arms 21, 22 and 25, 26 hang in a substantially vertical position as illustrated in FIG. 1 by the solid lines. When the guards 34 strike an obstruction, the swing arms pivot pendulum-like so that the cutter assembly 20 moves at first primarily rearwardly and thence upwardly and rearwardly as represented by the dashed line from position P1 to P2 in FIG. 1. Further, because the preferred suspension system includes swing arms only at the sides of the cutter assembly and the cutter assembly is quite long (for example, seven to twelve feet in cutting swath), if the obstruction is located toward one side of the assembly, only that side will swing out of the way, not the entire cutter assembly. This further reduces the mass of the portion of the assembly that must be moved to clear an obstacle and thereby improves the response time and enhances the ability of the system to respond quickly at higher ground speeds. The mass of the moveable assembly has already been reduced over conventional designs which mount the cutter bar assembly on large side plates and require the entire cutter head to be lifted.

Considering the configuration of the cutter guards in more detail, with reference to FIGS. 3 and 4, each cutter guard 34 includes a mounting base portion 35 with two tines 36 and 37 extending outwardly therefrom in a generally parallel spaced relation. The mounting base portion 35 includes a pair of apertures 35a to facilitate mounting of the cutter guard 34 on the cutter frame 30 such as by way of machine screws or nuts and bolts. As shown in FIG. 4, the bottom surface 38 of the cutter guard 34 is flat. The forward edge of each tine defines a curved nose portion 39. Each tine is provided with the transverse slot 41 at its rearward edge which receives the cutting blade of the cutting bar. The teeth on the blade 33 align with the tines 36, 37 of the guard when they are assembled. Each tine is also provided with a transverse channel 42 at its back edge which receives the back of the blade, (shown by the dashed line in FIG. 4), the back edge of which has a guide ridge 43 which extends along the forward edge of the mounting base 35 and stabilizes the guard when mounted to stringer 30. Further, the upper surfaces of the tines of the guards are shaped to extend upwardly and rearwardly in a smooth conformation to assist in lifting the lodged hay as the downwardly inclined blade engages the stems at an angle chosen to direct the blade more perpendicular to the stems. Even if the hay is not matted, the downward and forward inclination of the blade does a very effective job in cutting the crop closer to the ground. The guards become wider toward the rear to facilitate guiding the hay into the cutter blade and to achieve a scissors-like shearing or cutting action.

The cutter assembly may be rigid with the blade inclined downwardly and forwardly, but this may also be done hydraulically as in the illustrated embodiment. Referring to FIGS. 1 and 5, the frame 30 is mounted by bushings (not shown) to side plates 31, 32 and hydraulic actuators 44 are mounted to the side plates and have their moveable rods 44a connected through link 44b to the frame 30 for pivotal movement about a horizontal axis between a use position as illustrated in FIG. 1 in which the blade 33 and guards are directed downward at an angle of approximately 30° relative to the horizontal, and/or as represented by the dashed line, a secondary use position in which the cutting blade 33 and guards 34 mounted thereon are directed in a generally horizontal (or upward) direction. The movement of the cutting bar and guard assembly between its use positions is effected by operating the hydraulic actuators 44.

The cutter blade 33 is driven in a reciprocating manner by a conventional drive means 20a including a drive pulley 60 mounted to the left side section 13 of the frame 11 between the front swing arm 21, and the rear swing arm 25, a driven pulley 62, and a pitmanless drive mechanism 63 for converting rotary motion of the driven pulley 62 to the reciprocating motion for the cutter blade.

A conventional reel 45 having a plurality of tines 46 is mounted in the forward portion of the frame 11 between left side section 13 and right side section 15. A pair of pressure rolls 48 and 49 are rotatably mounted between the left side section 13 and right side section 15 of the frame 11 near the rearward portion thereof. A stationary mowed material guide 55, attached to the cutter assembly 20 behind the cutter blade 33, and a movable mowed material guide 57, attached to the stationary mowed material guide 55, direct cut hay toward the crusher rolls 48 and 49 which are driven in opposite directions to draw the mowed hay therebetween, conditioning and delivering it to the discharge end of the mower apparatus 10. A suitable shield 59 is mounted above the crusher rolls 48 and 49 to direct the crushed hay to the rear of the mower apparatus 10.

A pair of transport wheels 70 are pivotally attached to the rear lower portion of the frame 11 by associated arms 71 and movable by way of respective hydraulic cylinder 72 between the use position illustrated and a transport position shown in FIG. 1 in phantom.

Digressing, in use, the mower apparatus 10 disclosed by way of illustration of the principles of the invention is pulled by a tractor (not shown). However, the novel arrangement of the cutter assembly and its suspension can be employed in self-propelled mowers. In one such apparatus, the frame 11 would terminate at the reels, the wheels 70 would be motorized, and the frame would be extended rearwardly to support the wheel drive motor, a caster wheel and a driver's seat.

As shown in FIG. 1, when the apparatus is in the operating or use position, the cutter blade 33 is located adjacent to the ground and inclined relative to the ground. The curved nose portions 39 of the cutter guards 34, which are mounted on the cutter frame, are the lowest and leading part of the cutter assembly. This inclined orientation of the cutting blade 33 allows lodged hay to be easily cut and to be cut close to the ground because the cutting blades engage the lodged hay generally perpendicular to the stems. Even in the case of vertical crop stem, however, the downward inclination of the cutter achieves a desired cutting action at a location closer to the ground, thereby recovering more of the crop. Also, the parallel linkage suspension mechanism 18 together with the reduced mass of the cutter assembly and the configuration of the guards 34 allow the cutter assembly to respond quickly to striking an obstruction, directing the cutter assembly first primarily rearwardly and thence upwardly and rearwardly allowing it to pass over the obstruction without damage to the cutting bar.

More specifically, in use, the leading part of the cutter blade is adjacent to the ground and the forward swing arms 21 and 22 are in a generally upright transverse plane, as are the rear swing arms 25 and 26. When the guards 34 strike an obstruction as seen in FIG. 1, the swing arms pivot pendulum-like so that the cutter assembly moves both rearwardly and upwardly in its clearing motion, but the initial motion is primarily rearward.

In contrast, referring to FIG. 6, conventional designs mounted the entire header assembly on a support so that it pivoted about a transverse axis located at approximately the same height as the cutter guards, but behind them. As shown schematically in FIG. 6, wherein the link is represented by member 115 and the cutter blade and guard by member 116, when the guards strike an obstruction, the cutter rotates clockwise upwardly and away from the obstruction.

Because the pivot axis of the prior art is behind the bar itself, a substantial impact force is normally encountered before the header assembly will respond. Obviously, this has the tendency to damage the header even if it is spring-biased, particularly if the obstacle struck has an upright surface. It will be observed that the initial movement of this prior art cutter blade and guard when it hits an object is upward. Any rearward movement is slight at first because of the location of the pivot. Due to the size and weight of the header assembly and the high ground speeds, damage can and does occur, although such systems have used counterbalancing springs to offset at least partially the weight of the assembly.

Referring to FIG. 7, in applicant's parallel linkage suspension mechanism 18, the swing arms represented by member 117 in the use position are substantially vertically oriented relative to the cutter blade and guard assembly represented by member 118. Also, the weight of the cutter bar is reduced. By providing that the swing arms in the use position are substantially vertically oriented, when an object is struck, the initial component of movement is primarily rearward. This enables the cutter assembly, upon striking an object, to respond by moving quickly rearwardly relative to the forwardly traveling main frame, and then, as the pendulum action continues, the cutter assembly elevates above the obstruction to a clearing height. Compare, for example, the two movements of equal angular displacement in FIG. 8 for angles A1 and A2, and it will be seen that vertical displacement increases as the movement increases, but the initial movement being horizontal enables the cutter bar to react quickly to reduce damage. For smaller obstacles, the cutter assembly remains parallel and the cutter bar continues its cutting action efficiently traveling only so high as to permit clearance of the actual obstacle. For larger obstructions which would cause damage, it can be seen that for greater heights, the vertical component of movement on the cutter assembly becomes progressively greater as the arms swing from a vertical position to, for example, a position, say 35° off the vertical position.

It will be appreciated that such quick reaction capability, responding to a "direct" engagement of an obstruction, is particularly important in agricultural equipment because of the high ground speeds and because of the particular nature of the cutting apparatus. As mentioned above, substantial damage to the cutter guards or bending of the cutter blades themselves could interfere with operation of the entire cutter bar and such damage may go unnoticed for some time.

Thus, the present invention has provided an agricultural mower having a parallel linkage suspension for the cutter assembly including swing arms which in the use position are substantially verticlly oriented, enabling the cutter assembly, upon striking an object, to respond by moving quickly rearwardly relative to the forwardly traveling main frame. Speed of resonse is enhanced because only the cutter assembly is suspended. Then, as the pendulum action continues, the cutter assembly elevates above the obstruction to a clearing height. For smaller obstacles, the cutter assembly remains parallel and continues its cutting action efficiently, traveling only so high as necessary to permit clearance of the actual obstacle. For larger obstructions which would cause damage, the vertical component of movement on the header assembly becomes progressively greater as the arms swing from a vertical position to clear the obstacle without damage to the cutter assembly or cutting mechanism.

Moreover, in one use position, the cutter blade and cutter guards are directed downwardly at an angle relative to the horizontal so tht the nose portions of the cutter guards define the lowest and leading part of the cutter assembly, and the cutting blades are oriented for optimum cutting of lodged hay.

Having thus disclosed preferred embodiments of the invention, persons skilled in the art will be able to modify certain of the structure which has been disclosed and to substitute equivalent elements for those described while continuing to practice the principle of the invention; and it is, therefore, intended that all such modifications and substitutions be covered as they are embraced within the spirit and scope of the appended claims.

We claim:

1. In an agricultural mower apparatus, the combination comprising: a main frame having support wheels; a cutter assembly including a cutter frame, guard means mounted on said cutter frame, and reciprocating cutter bar means received in said guard means; a parallel linkage suspension means for suspending said cutter assembly from said main frame with said cutter blade means located near the ground, said suspension means including first and second front swing arms each having a first end pivotally attached to said main frame near the forward portion thereof and a second end pivotally attached to said cutter assembly, said first and second front swing arms being attached to said main frame and said cutter assembly at opposite sides thereof; and first and second rear swing arms each having a first end pivotally attached to said main frame behind the respective first ends of said front swing arms and a second end pivotally attached to said cutter assembly, said first and second rear swing arms being attached to said main frame and said cutter assembly at opposite sides thereof, said swing arms in the use position hanging in a substantially vertical orientation and movable in a pendulum-like manner away from the use position, allowing said cutter assembly to move rearwardly and upwardly to a clearance position above and behind the use position, whereby the primary component of initial movement of said cutter assembly from its use position is rearward when an obstruction is struck, and the vertical component of movement of said cutter assembly becomes increasingly greater with continued movement of said cutter assembly toward said clearance position, and the transverse distance between the sides of said cutter assembly being sufficient so that each side may swing to said clearance position substantially independently of the other side such that when the obstruction is located toward one side of said cutter assembly, that side swings toward said clearance position and out of the way of the obstruction and the other side of said cutter assembly remains in cutting relation with said crops.

2. In an agricultural mower apparatus, the combination comprising: a main frame provided with support wheels; a cutter assembly including a cutter frame, guard means mounted on said cutter frame, and reciprocating cutter blade means recieved in said guard means; a parallel linkage suspension means for suspending said cutter assembly from said main frame with said cutter blade means located near the ground, said suspension means including a pair of front swing arms each having a first end pivotally attached to said main frame near the forward portion thereof and a second end pivotally attached to said cutter assembly; and a pair of rear swing arms each having a first end pivotally attached to said main frame near the rear portion thereof and a second end pivotally attached to said cutter assembly, said swing arms in the use position hanging in a substantially vertical orientation and movable in a pendulum-like manner away from the use position, allowing said cutter assembly to move rearwardly and upwardly to a clearance position; and means for mounting said cutter frame on said suspension means with said guard means and blade means extending normally downwardly and forwardly at an acute included angle relative to the horizontal whereby the leading portions of said guard means are the lowest and leading part of said cutter assembly.

3. Mower apparatus according to claim 2, wherein said cutter guard means defines a plurality of laterally spaced pointed tines each having an upper surface extending in smooth conformation from the leading point thereof upwardly and rearwardly to engage and lift lodged crop.

4. Mower apparatus according to claim 3, wherein said mounting means includes means for moving said cutter assembly between an inclined position in which said cutter blade means is positioned at said downward and forward angle relative to the horizontal and a raised position in which said cutter blade means is raised with said blade means elevated above said inclined position.

5. Mower apparatus according to claim 2, wherein said guard means comprises a plurality of cutter guards, each including a mounting portion, a guide portion and said nose portion, said mounting portion attached to said cutter frame, said guide portion receiving said cutter blade means for guiding reciprocating motion thereof, and said nose portion defining a convex curved surface which slopes downwardly and forwardly from top to bottom of said cutter guard.

6. Mower apparatus according to claim 2, wherein said mounting means includes means for moving said cutter assembly between an inclined position in which said cutter blade means is positioned at said downward and forward angle relative to the horizontal, and a raised position in which said cutter blade means is raised above said inclined position.

7. Mower apparatus according to claim 2, wherein the primary component of initial movement of said cutter assembly when an object is struck is rearward and with continued rearward movement, the vertical component becomes progressively greater.

* * * * *